United States Patent
Dollar et al.

(10) Patent No.: US 7,614,013 B2
(45) Date of Patent: Nov. 3, 2009

(54) REMOTE MEDIA DETECTION AND PRESENTATION

(75) Inventors: William Dollar, Seattle, WA (US); Guillaume Simonnet, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 11/637,367

(22) Filed: Dec. 12, 2006

(65) Prior Publication Data

US 2008/0141298 A1    Jun. 12, 2008

(51) Int. Cl.
G06F 13/00    (2006.01)
G06F 15/00    (2006.01)

(52) U.S. Cl. .................. 715/851; 715/853

(58) Field of Classification Search ......... 715/851–853, 715/763–765, 780–783; 725/39, 45, 46
See application file for complete search history.

(56) References Cited

U.S. PATENT DOCUMENTS

| | | |
|---|---|---|
| 5,931,906 A | 8/1999 | Fidelibus, Jr. et al. |
| 6,721,955 B2 | 4/2004 | Khoo et al. |
| 6,804,674 B2 | 10/2004 | Hsiao et al. |
| 6,842,604 B1 | 1/2005 | Cook et al. |
| 7,076,494 B1 | 7/2006 | Baer et al. |
| 2001/0047297 A1* | 11/2001 | Wen ........................... 705/14 |
| 2002/0013852 A1 | 1/2002 | Janik |
| 2002/0112237 A1* | 8/2002 | Kelts .......................... 725/39 |
| 2002/0133561 A1 | 9/2002 | O'Brien et al. |
| 2002/0188944 A1* | 12/2002 | Noble ......................... 725/39 |
| 2003/0084452 A1 | 5/2003 | Ryan et al. |
| 2004/0025185 A1 | 2/2004 | Goci et al. |
| 2004/0143846 A1 | 7/2004 | Zeps et al. |
| 2005/0149872 A1 | 7/2005 | Fong et al. |
| 2006/0026065 A1 | 2/2006 | Bolatti et al. |

OTHER PUBLICATIONS

Bijsmans, Jeroen, "Network Music Displayer: Using a Graphical User Interface on a Personal Music Player", Date: Sep. 11, 2001, http://www.hpl.hp.com/techreports/2001/HPL-2001-210.pdf#search=%22%22user%20interface%22%20music%20-streaming%20photograph%20viewing%22.
Lee et al., "Designing the User Interface for the Físchlár Digital Video Library", Date: 2002, vol. 2, Issue 4, Article No. 103, http://jodi.tamu.edu/Articles/v02/i04/Lee/.
"STARBAK Streaming Solutions", http://www.ivci.com/streaming_starbak_streaming_solutions.html.

* cited by examiner

Primary Examiner—Kevin Nguyen

(57) ABSTRACT

Media experiences may be presented to a user on a local device organized by category and subcategory, even though the experiences may be served from various sources located on a network. A remote device with available media may establish a secure connection with the local device and transmit a mechanism for obtaining the media. The remote device will further transmit a listing of the available content. The media listing may be displayed to a user as another channel of media or other grouping as if the media source were local.

18 Claims, 4 Drawing Sheets

REMOTE MEDIA DETECTION AND PRESENTATION

BACKGROUND

Entertainment systems, especially home entertainment systems, have a wide variety of media sources from which to select. In general, the sources are of two types: those that are local to the interface device and those that come over a network. For example, an entertainment system may have mechanisms for playing music or video, such as a CD or DVD player, which would be a local media source. A remote source may include video, audio, or other media that comes through satellite, cable, internet, or other network, but may also include media sources that are located on other devices connected to a network. For example, computers connected to a local area network may have audio, video, or other media that can be enjoyed on the entertainment system.

As the media sources become more varied and increase in number, the user is faced with an enormous number of choices for media. The media may be available through varied connections and network paths, which can be confusing to a user.

SUMMARY

Media experiences may be presented to a user on a local device organized by category and subcategory, even though the experiences may be served from various sources located on a network. A remote device with available media may establish a secure connection with the local device and transmit a mechanism for obtaining the media. The remote device will further transmit a listing of the available content. The media listing may be displayed to a user as another channel of media or other grouping as if the media source were local.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
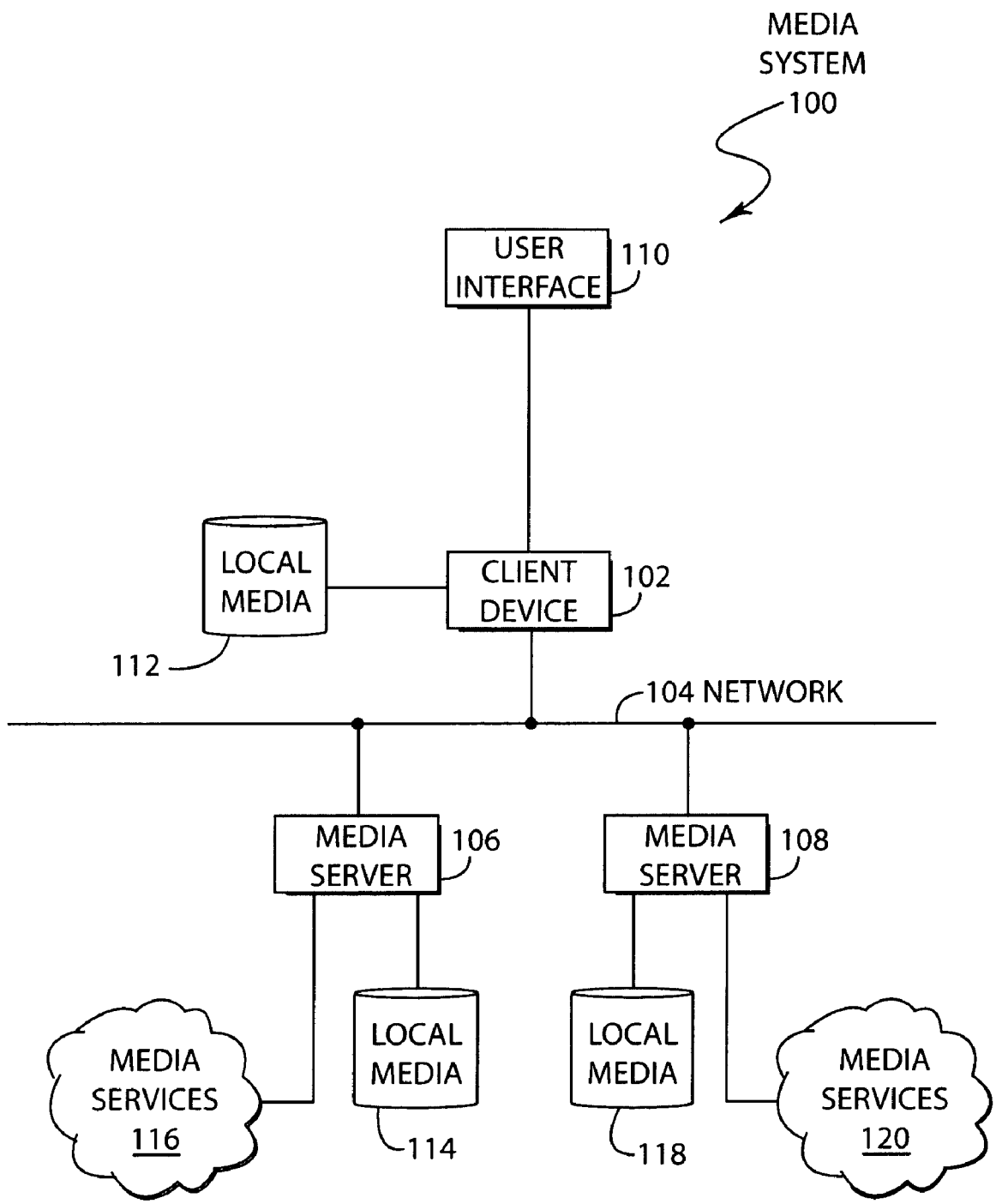
FIG. 1 is a pictorial illustration of an embodiment showing a media system in a network configuration.

Media experiences may be available from many sources on a network. A client device, through which a user consumes the experiences, may aggregate the available experiences into a cohesive user interface through which the user may browse and select the experiences.

The experiences are organized by category and subcategory based on content as opposed to being organized by the server or device from which the experience originated. For example, remotely sourced live television channels may be aggregated into a channel listing for all television channels available to the user, regardless if the channels come through a source local to that device or through one or more remote devices connected over a network.

The interaction between the local and remote devices may include one or more advertisements sent from the media source to client devices on the network. The advertisement may contain the category and subcategory of the media experiences as well as the necessary addresses and protocols necessary to establish a connection, request the specific experiences, and consume the experiences.

The advertisements enable each media server to have different entry points into the media content, and for those entry points to be selected and used in a user interface that shows the media experiences as if those experiences were sourced locally.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a media system. A client device 102 is attached to a network 104 and thereby to media servers 106 and 108. The client device 102 has a user interface 110 and may have some local media 112. Media server 106 has local media 114 as well as media services 116 that may be available through another network such as a cable television network, satellite network, or the internet. Similarly, media server 108 has local media 118 and remote media services 120.

The embodiment 100 may be a system for home entertainment. The client device 102 may be attached to a television which may serve as the user interface 110. Various media servers 106 and 108 may provide interfaces into a cable television network, repositories of home movies, collections of music files, digital versatile disk (DVD) movie collections, or any other type of media experience. The client device 102 may be a dedicated media viewer, a game console, a personal computer, or any other network attached device through which media may be consumed.

The client device 102 may have local media 112 that can be selected and consumed through the user interface 110. Local media 112 may be any type of media that is sourced through the client device 102. For example, local media 112 may be a DVD player attached to the client device, a directory of music files, or any other media. In some cases, a client device 102 may have direct connections to various media services such as on-demand audio or video, cable television, or other media sources.

The media servers 106 and 108 may be any network attached device that is capable of serving media to another device. In some cases, the media server 106 may be a large server computer with extensive data storage and processing capabilities. In other cases, the media server 106 may be a portable music player, a digital video recorder ('DVR'), a cable television or satellite television set top box, or any other device capable of serving media.

Through the network 104, the client device 102 may provide various media experiences for a user of the client device 102, including experiences that are provided from one or more of the media servers 106 and 108. The media experiences may be aggregated from the various media sources and presented to the user grouped by various categories and subcategories. The media sources on a media server 106 or 108 may be made available in the form of various entry points that are classified and able to fit within a unified user interface at the client device 102. For example, the client device 102 may aggregate several live television sources and present a unified list of channels to the user. The user may or may not be able to distinguish from where a specific channel is being served.

Figure 2:
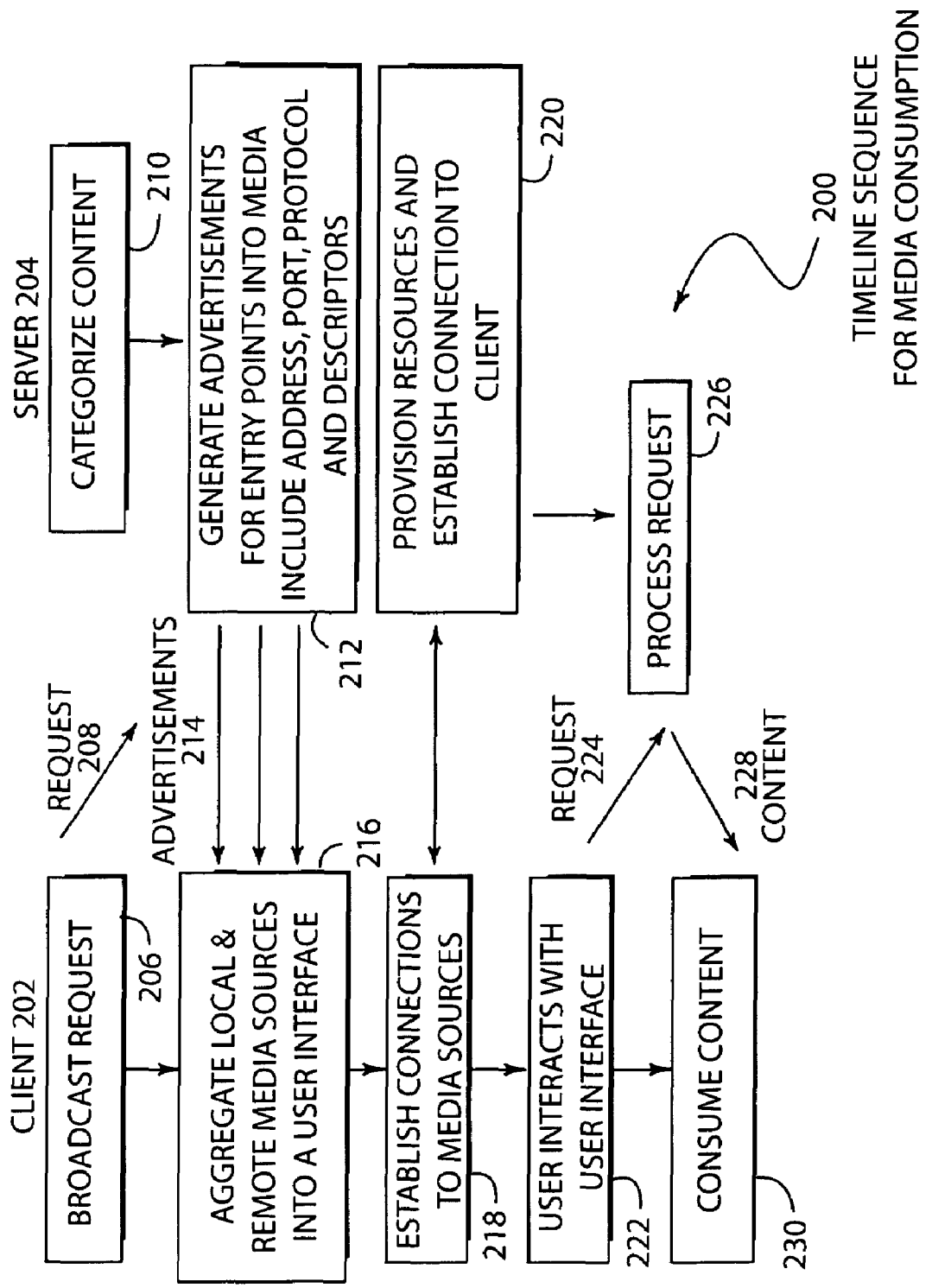
FIG. 2 is a timeline illustration of an embodiment showing a sequence for media consumption.

FIG. 2 is a timeline illustration of an embodiment 200 showing a timeline sequence for media consumption. The actions of a client 202 are shown on the left while the actions of a server 204 are shown on the right. The client 202 may broadcast a request for media sources in block 206, which sends a request 208 to the server 204. On the media server 204, the content or media experiences are categorized in block 210.

The media server 204 may issue several advertisements 214 over the network. Each advertisement may be a separate entry point into the media experiences available on the media server 204, and may contain addresses, port numbers, protocols, and descriptors of the media experiences. The advertisements 214 may have sufficient information to enable the client 202 to initiate communication, generate requests for media experiences, and control the flow of the media experience to the client 202.

The client 202 may aggregate local and remote media sources into a unified user interface in block 216. The method by which the client 202 aggregates and presents the various media sources may vary between implementations, hardware, and user preferences. In many cases, the user interface may present the content or media experiences in a categorized manner, based on the content of the media experiences rather than classified by the server or source of the media.

Connections with the media sources are made by the client 202 in block 218. The server 204 may provision resources and establish a connection to the client in block 220. In some embodiments, a connection between the client 202 and server 204 may be established before the user interface is created in block 216. In such an embodiment, the advertisements 214 may or may not contain sufficient information for the client 202 to generate the necessary user interface in block 216. In other embodiments, a connection between the client 202 and server 204 may be performed after the user has requested media from the server 204.

In many embodiments, the server 204 may provide several advertisements 214, and each advertisement may provide a different entry point into the media experiences on the server 204. In some cases, the various advertisements 214 may include certain media experiences that are categorized in several different manners and thus a client device 202 may reach the media through several different routes. For example, the server 204 may have a DVD of the movie "Terminator" loaded into a DVD player. The server 204 may produce advertisements categorized by "On Demand Video", "Movies", "Action/Drama", or any other classification. Each of the example advertisements may include different ports, protocols, or addresses for reaching the same content on the server 204. The various categories may be used to produce several groupings of programming selections for the user interface.

When the user navigates the user interface in block 222 and selects a particular media experience to consume, a request 224 is transferred to the server 204 which processes the request in block 226 and sends requested content 228 to the client 202. The client 202 then displays the content for the user to consume in block 230.

Figure 3:
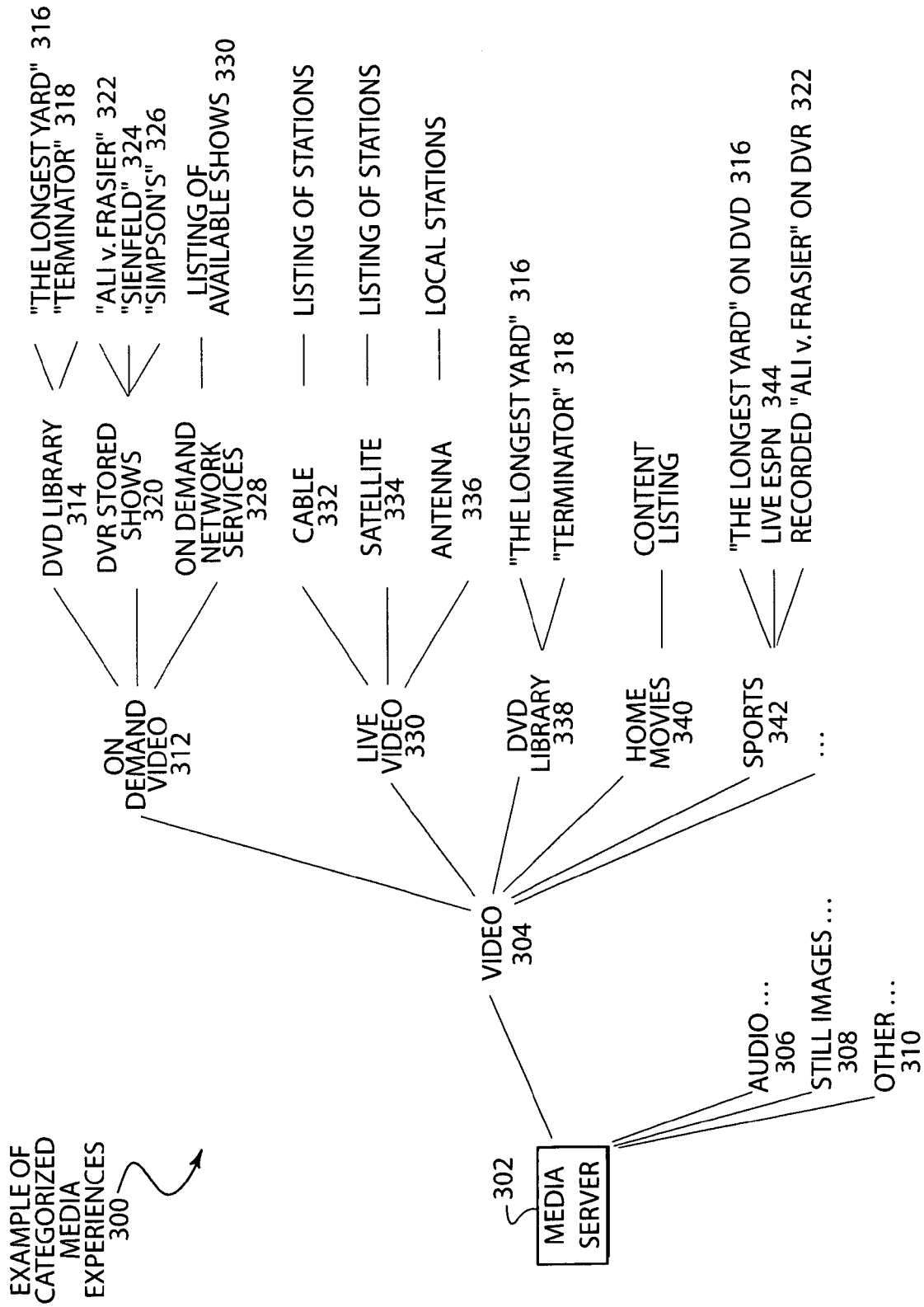
FIG. 3 is a diagrammatic illustration of an embodiment showing an example of categorized media experiences.

FIG. 3 is a diagram of an embodiment 300 of an example of categorized media experiences. A media server 302 has media broken down into four main categories: video 304, audio 306, still images 308, and other 310. For the purposes of illustration, a partial breakdown of the video content 304 is shown.

On Demand Video 312 is a subcategorization of video 304 and contains a DVD Library 314 that has "The Longest Yard" 316 and "Terminator" 318. On Demand Video 312 also includes DVR Stored Shows 320 that contains "Ali v. Frasier" 322, "Seinfeld" 324, and "Simpson's" 326. On Demand Video 312 further includes On Demand Network Services 328 that includes a listing of available shows 326.

On demand video 312 is only one way that content on the media server 302 can be classified, but may be an entry point into the media server 302. When an advertisement is sent by the media server 302, the advertisement or subsequent communications may be used to generate a menu listing or other user interface that contains the various shows or movies within the entry point. In some instances, the user interface may show the headings DVD Library 314, DVR Stored Shows 316, and On Demand Network Services 328. The user may be required to drill down into DVD Library 314 to find "The Longest Yard" 316 and "Terminator" 318. In other instances, the user interface may show the various media experiences available under the On Demand Video heading, and thus the user would see the labels "The Longest Yard" 316, "Terminator" 318, "Ali v. Frasier" 322, etc.

In addition to or in lieu of the entry point On Demand Video 314, the media server 302 may provide entry points for one or more of the DVD Library 314, DVR Stored Shows 320, and On Demand Network Services 328. In some embodiments, the entry points may correspond to the source of the media experience and the advertisement may include a protocol containing specific commands that are used to operate the source of the media. For example, a media server 302 with On Demand Network Services 328 may send an advertisement with a specific protocol required for searching, displaying, selecting, and controlling on demand video from a service provider such as a cable television service. Such a protocol may be different for operating an integral digital video recorder ('DVR') or a DVD player. In other embodiments, the media server 302 may provide a unified interface and protocol whereby several different sources may be operated using the same protocol.

The subcategory Live Video 330 may contain Cable 332, Satellite 334, and Antenna 336. Each of the Cable 332, Satellite 334, and Antenna 336 may have a listing of stations as well as a listing of current and future content. The listing of current and future content for each source may be separate data that is provided through a separate network mechanism, such as downloading XML versions of program listings through the internet. In some embodiments, a client device may us Live Video 330 as an entry point to the media server 302 but display all of the various channel options from Cable 332, Satellite 334, and Antenna 336 as a single list without separating the channels from each source. Some media experiences, such as a listing of stations and the broadcast schedule for the stations may be presented to the user as interactive experiences. Any reference to media experiences shall include any type of interactive media experience as well.

Another subcategory of Video 304 is DVD Library 338. DVD Library 338 may be identical to DVD Library 314 and includes "The Longest Yard" 316 and "Terminator" 318. The arrangement of various categories and subcategories and the classification of each category may vary from one implementation to another. In some cases, the categorization may be determined by a standards body, by a software developer, by the user, or by any other mechanism.

Yet another subcategory of Video 304 is Home Movies 340 that may have a content listing. Such a content listing may be a user created content listing by category.

Still another subcategory of Video 304 is Sports 342. Within the Sports 342 subcategory, various media experiences that relate to sports may be found. For example, "The Longest Yard" 316, a live channel of ESPN 344, and a pre-recorded bought "Ali v. Frasier" 322 may be categorized within Sports 342. The various experiences within Sports 342 may be drawn from different media providers. For example, "The Longest Yard" 316 may be from a DVD player, live ESPN 344 may be from one or more of the Cable 332 or Satellite 334 sources, and "Ali v. Frasier" 322 may be from the DVR source.

Any point within the hierarchy of the media structure may be used as an entry point for a media client. For example, the heading Video 304 may be one entry point while Sports 342 is another. The entry points may be made available by the media server 302 and provide the communication protocols that may be used to determine the available experiences within the entry point and request, translate, and control the experiences as needed.

Figure 4:
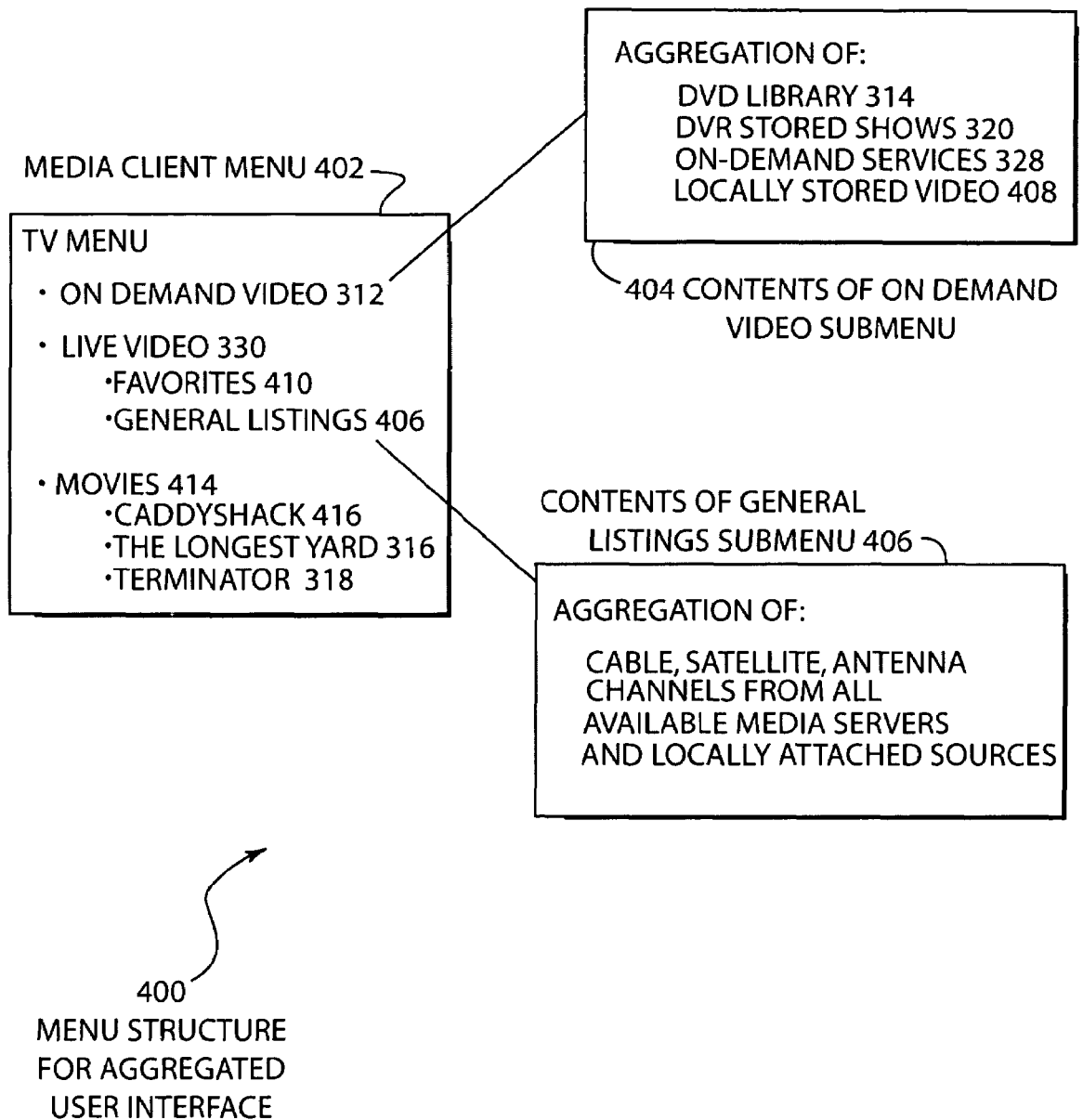
FIG. 4 is a diagrammatic illustration of an embodiment showing an example of a menu structure for an aggregated user interface.

FIG. 4 is a diagrammatic illustration showing embodiment 400 of a menu structure for an aggregated user interface. The embodiment 400 assumes that media server 302 is used with the categorized experiences of embodiment 300.

A media client menu 402 contains a television menu that a user may see. The upper categories are On Demand Video, Live Video, and Movies. The particular arrangement and selection of items shown in the menu 402 may not be the full complement of media experiences as described in embodiment 300. In some instances, certain portions of the media experiences may be restricted to specific devices, users, or accounts. In other instances, the media experiences may be restricted by a licensing or content use restriction. In still other instances, the media experiences may be selected by tracking of user preferences and selecting appropriate media experiences based on past selections.

The media client menu 402 contains a hierarchical list. The first level selections are On Demand Video, Live Video, and Movies. When a user selects On Demand Video, a second menu 404 may appear that is an aggregation of DVD Library 314, DVR Stored Shows 320, On Demand Services 328, and Locally Stored Video 408.

The menu 402 also includes Live Video 330. Under the Live Video 330 heading is a Favorites 410 submenu and a General Listing 406 submenu. The General Listing 406 submenu may include an aggregation of cable, satellite, antenna channels from all available media servers plus any locally attached live video sources.

In some instances, media experiences may be listed in a submenu such as menus 404 and 406 or the media experiences may be incorporated into a higher level menu. For example, the heading Movies 414 contains "Caddyshack" 416, "The Longest Yard" 316, and "Terminator" 318. The movie "Caddyshack" 416 may be from a local source while the movies "The Longest Yard" 316 and "Terminator" 318 may be from the media server 302. The media experiences "Caddyshack" 416, "The Longest Yard" 316, and "Terminator" 318 may be subordinate to the categorization Movies 414.

The media client menu 402 may be an aggregation of several media sources, both local to the media client device and remotely available over a network. A remote media source may be an entry point into a categorized media arrangement, and a single media server may have several entry points arranged various configurations that may be useful.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
    receiving at least one advertisement for a media source from a media server, said advertisement comprising:
        a content categorization, said content categorization being a subcategorization based on content within one of a group of video, audio, and still images; and
        descriptive data for said media source comprising content subcategorization for experiences available on said media source;
    generating a hierarchical user interface based at least in part on said at least one advertisement, said hierarchical user interface comprising:
        said media source arranged by said content categorization on a first level of said hierarchical user interface;
        said descriptive data arranged on a second level of said hierarchical user interface; and
        an address for said media source;
    displaying said user interface;
    receiving a user input for a first experience available on said media source;
    connecting to said media source;
    receiving said first experience; and
    displaying said first experience.

2. The method of claim 1 further comprising:
    transmitting a broadcast request over a network for media sources.

3. The method of claim 1, said content categorization being a media type comprising at least one of a group composed of video, audio, and still images.

4. The method of claim 1, said first experience being an interactive experience.

5. The method of claim 1, said hierarchical user interface further comprising at least one local media source.

6. The method of claim 1, said hierarchical user interface further comprising a plurality of remote media sources.

7. The method of claim 1, said second level being accessible through said first level.

8. The method of claim 1, at least a portion of said second level being displayed with said first level.

9. The method of claim 1 further comprising establishing a secure connection with said media source.

10. A media client comprising:
    a display;
    a connection to a network; and
    a processor adapted to:
        receive at least one advertisement for a media source from a media server, said advertisement comprising a content categorization, said content categorization being a subcategorization based on content within one of a group of video, audio, and still images, and descriptive data for said media source comprising content subcategorization for experiences available on said media source;
        generate a hierarchical user interface based at least in part on said at least one advertisement, said hierarchical user interface comprising said media source arranged by said content categorization on a first level of said hierarchical user interface, said descriptive data arranged on a second level of said hierarchical user interface;
        display said user interface;
        receive a user input for a first experience available on said media source;
        connect to said media source;
        receive said first experience; and
        display said first experience.

11. The media client of claim 10, said processor further adapted to:
    transmit a broadcast request over a network for media sources.

12. The media client of claim 10, said content categorization being a media type comprising at least one of a group composed of video, audio, and still images.

13. The media client of claim 10, said first experience being an interactive experience.

14. The media client of claim 10, said hierarchical user interface further comprising at least one local media source.

15. The media client of claim 10, said hierarchical user interface further comprising a plurality of remote media sources.

16. The media client of claim 10, said second level being accessible through said first level.

17. The media client of claim 10, at least a portion of said second level being displayed with said first level.

18. A media server comprising:
    a plurality of media sources, each of said media sources being arranged by category and by subcategory and comprising at least one media experience;
    a connection to a network;
    a processor adapted to:
        generate a plurality of entry points into said plurality of media sources;
        for each of said plurality of entry points, generate an advertisement, said advertisement comprising a content categorization, said content categorization being a subcategorization based on content within one of a group of video, audio, and still images, descriptive data for said media source comprising content subcategorization for said media experiences available on said entry point, a network address, and a protocol for accessing said media source;
        transmit said advertisement to a media client for use in generating a hierarchical user interface;
        receive a request from said media client for said media experiences using said protocol; and
    transmit said media experience over said network to said media client.

* * * * *